April 9, 1940.  M. J. MORIARTY  2,196,472
FISHING APPARATUS
Filed July 19, 1937   2 Sheets-Sheet 1
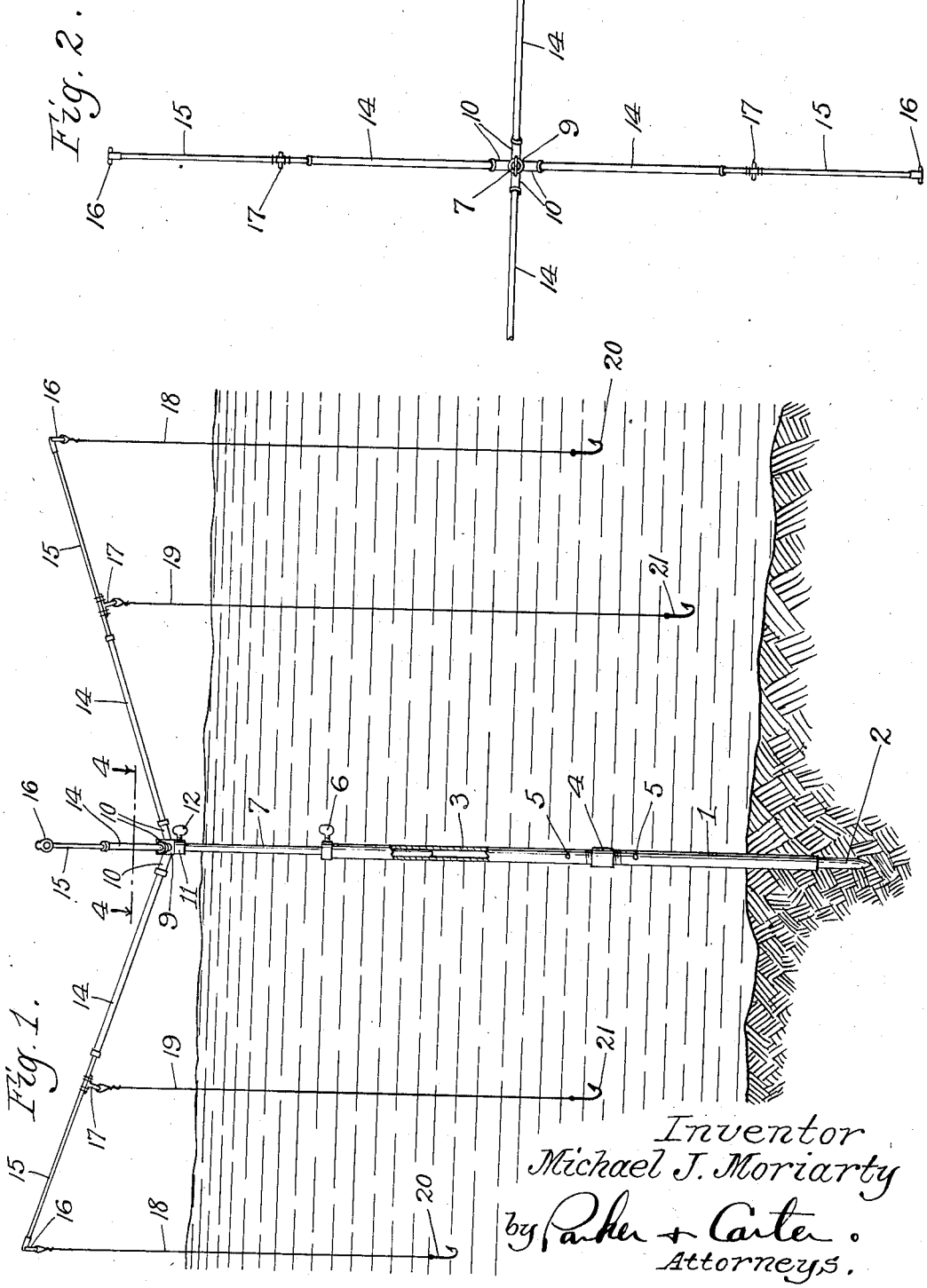
Inventor
Michael J. Moriarty
by Parker + Carter
Attorneys.

April 9, 1940.  M. J. MORIARTY  2,196,472
FISHING APPARATUS
Filed July 19, 1937  2 Sheets-Sheet 2
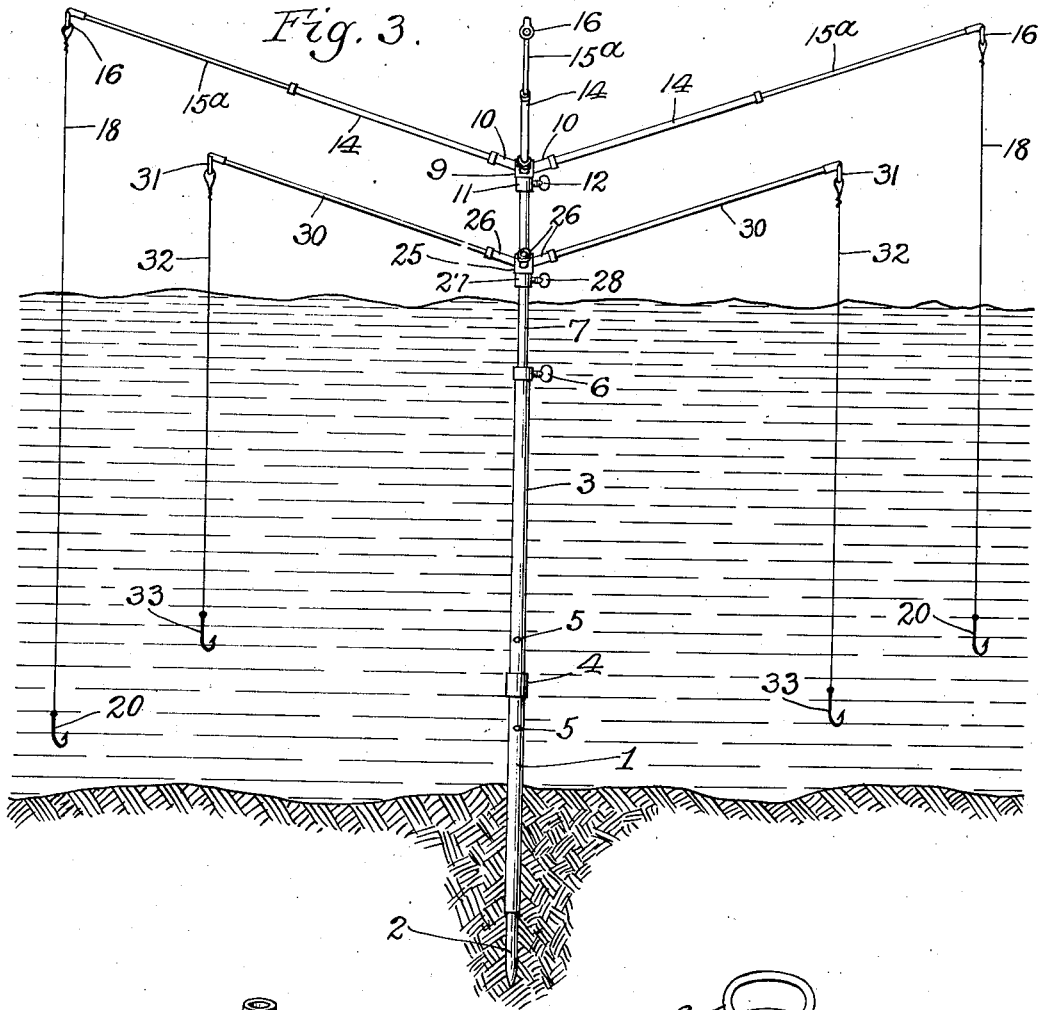
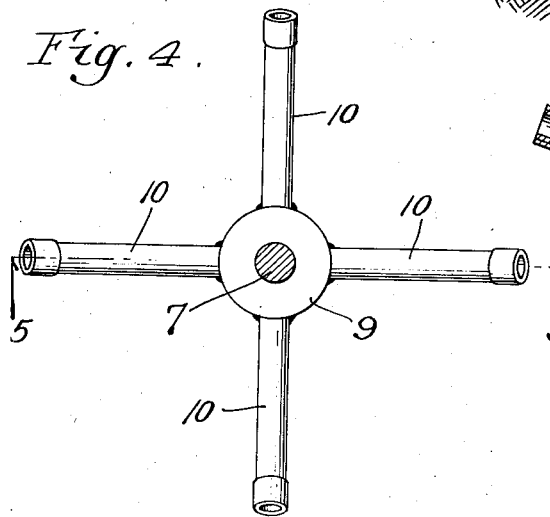
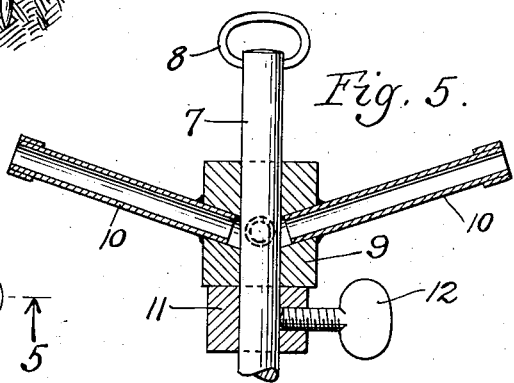
Inventor
Michael J. Moriarty
by Parker & Carter
Attorneys.

Patented Apr. 9, 1940

2,196,472

UNITED STATES PATENT OFFICE 2,196,472

FISHING APPARATUS

Michael J. Moriarty, Chicago, Ill.

Application July 19, 1937, Serial No. 154,471

7 Claims. (Cl. 43—27)

This invention relates to a fishing apparatus or so-called fishing "tree." It has for one object to provide a means which can be readily put into use by being thrust into the bottom of a body of water.

Another object is to provide means in connection with such an apparatus for supporting a plurality of lines. Another object is to provide means in connection with such an apparatus for the movement of the lines in response to the movement of a fish. Another object is to provide a device of the type suggested having a variety of adjustments whereby it is suitable for use in connection with water of different depths and whereby it may be readily demounted for transportation.

Other objects will appear from time to time in the specification and claims.

The invention is illustrated more or less diagrammatically in the accompanying drawings, wherein:

Figure 1 is a side elevation of one form of the device, with parts in section and parts broken away;

Figure 2 is a partial plan view with parts omitted;

Figure 3 is a side elevation similar to Figure 1 showing a modified form;

Figure 4 is a section taken at line 4—4 of Figure 1, on an enlarged scale, showing parts in section and parts in plan;

Figure 5 is a vertical sectional detail taken at line 5—5 of Figure 4.

Like parts are designated by like characters throughout the specification and drawings.

The main base or support member may be formed of a plurality of separable parts for convenience in transportation and storage. As shown it includes a lower member 1 which is preferably tubular as shown and carries a pointed bottom member 2 and an upper member 3 which also may be tubular, the two being joined by a threaded coupling 4. Each of the sections, whether there be two or more, may have perforations 5 to receive an operating tool for screwing them together or unscrewing them. 6 is a thumb screw mounted in the upper end of the section 3 and arranged to be screwed in or out to secure the adjustable telescoping member 7 in place. Thus the member 7 may be moved in and out of the tube 3 either for folding or for adjustment of the hooks with respect to the water level and may be secured in adjusted position by the thumb screw 6.

An eyelet or ring 8 may be positioned in the upper end of the member 7 as shown in Figure 5, and acts as a stop for the member 9 to limit its inward movement with respect to the tube 3. It may also be used as a handle for carrying the apparatus.

9 is a hub member mounted for rotation about the member 7 and arranged also to slide up and down on the member. One or more sockets or short tubes 10 is secured to the member 9 in any desired manner and these members 10 serve as sockets for poles or rods.

A collar 11 is mounted on the member 7 and may be adjusted vertically to the desired position on this member and then held in such an adjusted position by the thumb screw 12. Rod or pole sections 14, 15 may be inserted in the sockets 10 and any other sort of pole or rod might be used. As shown in Figure 1 the rods are formed of these two sections and carry eyelets 16 and 17, to which fishing lines 18 and 19 are secured, respectively. To the lines 18 and 19 are secured fish hooks 20 and 21, respectively. The invention is not limited to the particular details of the poles or rods shown nor is it limited to the particular details of the lines and hooks. Any desired rods, lines, hooks or bait may be used.

As shown in Figure 3 the device is generally similar to that shown in Figure 1 except that two hubs are provided and hence two sets of lines may be used. The upper row of fishing poles, in the form shown in Figure 3 comprises members 14 and 15a, differing from the members 14, 15 of Figure 1 by the omission of the eyelets 17.

In the form of Figure 3 a second hub 25 similar to the hub 9 is shown as mounted on the member 7. It has tubular arms or sockets 26 and is supported for rotation upon a collar 27 which is adjustably held in position by a set screw 28. Removably positioned in the sockets 26 are sections of a fishing rod 30 which carry eyelets 31 at their ends to which are secured lines 32 which carry hooks 33.

It will be realized that whereas I have herewith shown and described a practical operative device, nevertheless many changes might be made in the size, shape, number and disposition of the parts without departing from the spirit of the invention and I wish, therefore, that my showing be taken as in a sense diagrammatic.

The use and operation of the invention are as follows:

For transport, the device may be taken apart, the fishing poles or rods being removed from the sockets, the member 7 being telescoped fully into the member 3. This is made possible by loosening the set screws 6 and 12 and when the member 7 is completely retracted into the tube 3 tightening them again to hold the parts together. The sections 1 and 3 are separated and the entire apparatus may then be bundled together in a compact bundle, for storage or transportation.

When it is to be used, it is assembled as shown and while only two sections 1 and 3 are shown, obviously any desired number may be used and additional sections might be secured by threaded couplings 4 in the manner in which the sections 1 and 3 are secured together.

With the central section properly assembled and secured in the ground or floor of the body of water by being driven into it as shown in Figures 1 and 3, the member 7 having been properly adjusted for the depth of the water and the hub 11 having been adjusted properly with respect to the water so as to raise the poles and lines to the desired height, the apparatus is in condition for use. Any form of hook or bait, natural or artificial, may be used.

With the parts so arranged, should a fish take one bait or hook, he will almost certainly try to get away and in doing so will cause movement, and particularly rotation, of the hub about the axis of the member 7. This causes movement of the rest of the hooks or baits, causing the entire apparatus to swing or rotate around the standard. Other fish seeing the hooked fish in motion and seeing the other baits or hooks or lures in motion, will be attracted and will seize the other baits.

The dimensions of the poles and the lengths of the lines will ordinarily be such as to prevent tangling, although this is not essential.

In the form shown in Figure 3, since there are two hubs free to rotate on the shaft 7, one may rotate while the other is stationary, for example, when a fish has taken the bait on a line supported by the lower hub, while none of the baits on lines supported by the upper hub has been taken, but if hooks supported from each of the hubs have been taken, then both sets of rods may be in motion; they may move in opposite directions from each other or in the same direction.

A third hub might be supported on the exterior of the member 3, if desired, and it would be mounted for rotation and held from below by a collar similar to the collars 11 and 27. While the apparatus is shown with the hubs and rods positioned above the water, for certain purposes it might be desirable so to adjust the parts as to position some or all of them below the surface of the water. The invention is not limited in its use to the particular adjustment shown in this respect.

I claim:

1. In combination in a fishing apparatus, a standard, adapted to be inserted into the ground under a body of water, and a hub positioned for rotation about said standard, a plurality of socket portions supported from said hub, fishing rods secured in said sockets, said rods being adapted to carry fishing lines, the assembly of hub, sockets, rods and lines being adapted to rotate freely about said standard.

2. In combination in a fishing apparatus, a standard adapted to be inserted into the ground under a body of water, said standard comprising a socket, a supporting member adapted to be adjustably inserted into said socket, means on said socket for securing said supporting member in adjusted position, a collar-like member mounted upon said supporting member and provided with means for adjustably positioning it with respect to said supporting member, a hub positioned for rotation about the axis of said standard, a plurality of socket portions supported from said hub, and fishing rods secured in said sockets, said rods being adapted to carry fishing lines, the assembly of hub, sockets, rods and lines being adapted to rotate freely about said standard.

3. In combination in a fishing apparatus, a standard, adapted to be inserted into the ground under a body of water, a collar-like member supported from said standard and provided with means for adjustably positioning it with respect to said standard, a hub positioned for rotation about the axis of said standard and being supported by said collar, a plurality of socket portions supported from said hub, and fishing rods secured in said sockets, said rods being adapted to carry fishing lines, the assembly of hub, sockets, rods and lines being adapted to rotate freely about said standard.

4. In combination in a fishing apparatus, a standard, adapted to be inserted into the ground under a body of water, said standard comprising a socket, a supporting member adapted to be adjustably inserted into said socket, means on said socket for securing said supporting member in adjusted position, a collar-like member mounted upon said supporting member and provided with means for adjustably positioning it with respect to said supporting member, a hub positioned for rotation about the axis of said standard and being supported by said collar, a plurality of socket portions supported from said hub, and fishing rods secured in said socket, said rods being adapted to carry fishing lines, the assembly of hub, sockets, rods and lines being adapted to rotate freely about said standard.

5. In combination in a fishing apparatus, a plurality of separable members adapted to be joined together to form a single standard, having a pointed member adapted to be inserted into the ground under a body of water, said standard comprising a socket, a supporting member adapted to be adjustably inserted into said socket, means on said socket for securing said supporting member in adjusted position, a collar-like member mounted upon said supporting member and provided with means for adjustably positioning it with respect to said supporting member, a hub positioned for rotation about the axis of said standard and being supported by said collar, a plurality of socket portions supported from said hub, and fishing rods removably secured in said sockets, said rods being adapted to carry fishing lines, the assembly of hub, sockets, rods and lines being adapted to rotate freely about said supporting member and standard.

6. In combination in a fishing apparatus, a standard, and a hub-like member supported therefrom for free rotation, socket portions carried by said hub, fishing rods in said sockets, said rods being adapted to carry fishing lines and hooks, the assembly of hub, sockets, rods, lines and hooks being adapted to rotate freely.

7. In combination in a fishing apparatus, a standard, and a plurality of independent hub-like members independently supported therefrom one above the other for free and independent rotation, socket portions carried by said hubs, fishing rods in said sockets, the rods of one hub being shorter than those of the hub above it, said rods being adapted to carry fishing lines and hooks, the assemblies of hubs, sockets, rods, lines and hooks being adapted to rotate freely.

MICHAEL J. MORIARTY.